United States Patent [19]
Boyce et al.

[11] Patent Number: 6,034,016
[45] Date of Patent: Mar. 7, 2000

[54] METHOD FOR REGENERATING HALOGENATED LEWIS ACID CATALYSTS

[75] Inventors: C. Bradford Boyce, Baton Rouge; Randolph K. Belter, Zachary, both of La.

[73] Assignee: LaRoche Industries Inc., Atlanta, Ga.

[21] Appl. No.: 09/074,685

[22] Filed: May 8, 1998

[51] Int. Cl.[7] .............................. B01J 20/34; B01J 27/06; B01J 27/135; B01J 27/132; B01J 27/128
[52] U.S. Cl. .................................. 502/20; 502/22; 502/35; 502/36; 502/224; 502/227; 502/228; 502/229
[58] Field of Search .................................. 502/20, 22, 35, 502/36, 224, 227, 228, 229

[56] References Cited

U.S. PATENT DOCUMENTS

| | | | |
|---|---|---|---|
| 3,385,794 | 5/1968 | Scherer et al. | 502/35 |
| 3,760,059 | 9/1973 | Ertel et al. | 423/87 |
| 3,806,589 | 4/1974 | Becher et al. | 423/491 |
| 4,069,268 | 1/1978 | Siskin et al. | 585/375 |
| 4,469,804 | 9/1984 | Johnson | 502/32 |
| 5,094,988 | 3/1992 | Kellner et al. | 502/181 |
| 5,332,790 | 7/1994 | Bierschenk et al. | |
| 5,728,639 | 3/1998 | Felix | 502/33 |
| 5,880,049 | 3/1999 | Lacroix et al. | 502/36 |

*Primary Examiner*—Mark L. Bell
*Assistant Examiner*—Patricia L. Hailey
*Attorney, Agent, or Firm*—Richard J. Hammond

[57] ABSTRACT

A method for removing high molecular weight solid and liquid tars and oligomers from halogenated Lewis acids catalysts is disclosed. The Lewis acids incorporating such tars and oligomers are treated with an oxidizing agent such as chlorine, a halogen fluoride or mixtures thereof for a time and at a temperature sufficient to oxidize said solid tars and oligomers. The oxidation causes such tars and oligomers to form oxidation products, which can be separated from the halogenated Lewis acid.

18 Claims, No Drawings

# METHOD FOR REGENERATING HALOGENATED LEWIS ACID CATALYSTS

FIELD OF INVENTION

This invention relates to a method for the regeneration of halogenated Lewis acid catalysts. More particularly, spent halogenated Lewis acid catalysts are regenerated in the process of this invention by oxidizing such catalysts with chlorine, chlorine fluoride, chlorine trifluoride or fluorine.

BACKGROUND OF THE INVENTION

In the past, the commercial preparation of chlorofluorocarbons (CFC's) using Lewis acid catalysts has been used to carry out a variety of fluorine-halogen exchange and hydrofluorination reactions. These catalysts have now been successfully adapted to perform similar reactions for the "Third Generation" hydrochlorofluorocarbons (HCFC's) and hydrofluorocarbons (HFC's).

These HFC's and HCFC's are generally prepared from HCC's and hydrogen fluoride (HF) by moderate halogen exchange in which the carbon to chlorine bonds of the HCC are broken and carbon to fluorine bonds are formed in their place. The metal of the Lewis acid acts in its catalytic capacity leading to a more productive exchange process requiring milder reaction conditions. Exemplifying such reactions is the synthesis of 1,1-difluoroethane (HFC-152a) which may be prepared by allowing 1,1-dichloroethane and HF to react in the presence of various Lewis acids, such as the halides of various metals, e.g., tin (IV), titanium (IV), antimony (III), antimony (V) and the like.

By-products formed in the preparation of the Lewis acid catalyzed HFC's include an assortment of oligomeric and polymeric materials and low molecular weight halogenated dimers. Many of these byproducts take the form of oils or tars. These byproducts are detrimental to the halogen exchange process because of the tar formation associated with the presence of oligomers and high molecular weight materials forms complexes with the catalyst, suppressing catalytic activity.

Prior art catalysts, such as the antimony (V) halides, used in the production of such halocarbons as fluorotrichloromethane, difluorodichloromethane and fluorodichloromethane have been kept active by maintaining a constant feed of the oxidizer, chlorine gas. In such cases, the accumulation of tars is very low. However, the tars do accumulate and eventually deactivate the catalyst. This deactivated (spent) catalyst must be removed, with regeneration being carried out at an off-site facility. One such regeneration is demonstrated in U.S. Pat. No. 4,722,774 and is accomplished by an aqueous acid salvation of the antimony halides to separate them from the tars, followed by an intensive process to dehydrate the recovered catalyst.

U.S. Pat. No. 3,806,589 discloses that spent antimony halide catalysts resulting from the fluorination of chlorinated hydrocarbons can be regenerated by first dissolving the spent catalyst in water. After a series of steps including precipitation of antimony oxide with ammonia, treatment of the precipitate with hydrochloric acid, reduction in the presence of a redox catalyst, reprecipitation with ammonia and again dissolving the precipitate in hydrochloric acid, the latter solution is distilled to obtain antimony (III) chloride, which may be used as fresh catalyst.

The recovery of spent antimony (V) chloride which had been used in the fluorination of chloro-substituted methanes is disclosed in U.S. Pat. No. 3,760,059. The catalyst is reduced to antimony trichloride in a trichloroethylene solution. Antimony (III) chloride precipitates and is converted to antimony (V) chloride. Commercial utility of this process appears remote, since heavy loadings of tar defeat this technique.

EP 0 798 043 discloses that fluorination catalysts used in the preparation of hydrohalogenoalkanes can be regenerated by treatment with chlorine and hydrogen fluoride at 250° to 450° C. However, the application of chlorine oxidation in a "de-tarring" step in the liquid phase is impractical, because the temperatures that are required to maintain combustion generate extremely high pressures in a closed system.

SUMMARY

A method for passivating and optionally removing tars and oligomers from halogenated Lewis acids catalysts is disclosed. The Lewis acid catalysts incorporating such tars and oligomers are deactivated, i.e they are spent Lewis acid catalysts. They are produced from processes using hydrogen fluoride for the fluorination of halogenated hydrocarbons. These spent Lewis acid catalysts are treated with chlorine or a halogenated fluoride oxidizing agent in either the liquid or vapor state for a time and at a temperature sufficient to oxidize said tars and oligomers. The oxidation passivates such tars and oligomers, thereby reactivating the catalyst. In addition, the tars and oligomers form volatile oxidation products, which can be easily separated from the less volatile reactivated halogenated Lewis acid catalysts. Further, instead of relying on the volatility of the oxidation products produced from the oxidation reaction, extraction with hydrogen fluoride can also be effected to remove such products from the reactivated halogenated Lewis acid catalysts.

DESCRIPTION OF THE PREFERRED EMBODIMENTS

In the process of the present invention, spent halogenated Lewis acid catalysts are regenerated by being treated with one or more oxidizing agents that is chlorine or a halogen fluoride. These oxidizing agents of use in the present invention include chlorine and fluorine as well as the fluorides formed from combinations of fluorine with chlorine, e.g., $ClF_3$, fluorine with bromine, e.g., $BrF_3$, or fluorine with iodine, e.g., $IF_5$, as well as mixed halogen fluorides, i.e., the combination of fluorine with chlorine and bromine, e.g., $Cl_2BrF$, fluorine with chlorine and iodine, e.g., $Cl_2IF_3$, or fluorine with bromine and iodine $Br_2IF_3$. Mixtures of these compounds may also be used in the process of the present invention. The preferred oxidizing agents of use in the process of the present invention are selected from the group chlorine, chlorine fluoride, chlorine trifluoride and fluorine. These halogen fluorides are well known in the prior art. See, for example V. Gutman, *Halogen Chemistry*, Vol. I, pages 133 ff, Academic Press Inc., New York, 1967 and J. Simons, *Fluorine Chemistry*, Vol. 1, page 196–197, Academic Press Inc., 1950.

The term "spent" as it refers to the halogenated Lewis acid catalysts in this embodiment of the present invention is intended mean the Lewis acid catalysts that are produced from processing of HCC's, HCFC's and HFC's and have diminished activity, because of the accumulation of deactivating agents on or in such catalysts. The catalysts can be those obtained from either liquid phase fluorine exchange or hydrofluorination reactions, which have accumulated deactivating amounts of various minimally volatile heavy oligomers and light tars. Preferably, the spent Lewis acid catalysts treated by the method of the present invention are obtained from the processing of certain chlorofluoro olefins or chlorofluoro alkanes to produce fully fluorinated products, e.g. 1,1,1,3,3-pentafluoropropane.

The Lewis acid catalysts of use in the process of the present invention include the liquid or semi-liquid halide catalysts having at least one element selected from the group consisting of boron and aluminum of Group IIIa, tin of Group IVa, antimony of Group Va, iron, nickel and cobalt of Group VIII, titanium of Group IVb, vanadium, niobium and tantalum of Group Vb, chromium and tungsten of Group VIb.

It is preferred that the halide catalysts of use in the process of the present invention are the halides of antimony, tin, niobium, tantalum, titanium and tungsten, and most preferably a chloride, fluoride or chlorofluoride thereof Particularly preferred halide catalysts include boron trifluoride, aluminum chloride, aluminum chloro difluoride, aluminum fluoride dichloride, aluminum fluoride, iron (III) chloride, nickel (II) chloride, cobalt (II) chloride, antimony (V) chloride, antimony (V) dichloride triflouride, antimony (V) difluoride trichloride, antimony (III) fluoride, antimony (V) fluoride, niobium (V) chloride, tin (IV) chloride, titanium (IV) chloride, titanium (IV) dichloride difluoride, titanium (IV) fluoride, tungsten (VI) chloride, tungsten (VI) fluoride, tantalum (V) chloride, tantalum (V) fluoride and the like.

The halide catalysts that can be treated according to the process of the present invention, may optionally contain at least one other element such as silicon, zinc, magnesium, chromium, copper, vanadium, bismuth, molybdenum, etc, such being present in the form of their halide or oxyhalide.

The preparation of these catalysts is well known in the prior art. For examples see M. Hudlicky, *Chemistry of Organic Fluorine Compounds*, 2nd Ed., John Wiley & Sons, 1976.

The first embodiment of the present invention regenerates spent Lewis acid catalysts in the liquid phase. For liquid phase regeneration, any of the oxidizing agents set forth in this specification can be used. However, the preferred oxidizing agents of use in this embodiment are chlorine, chlorine fluoride, chlorine trifluoride or fluorine. Preferably chlorine trifluoride or fluorine and most preferably fluorine are used to regenerate (reactivate) the spent halogenated Lewis acid catalyst. Chlorine is the least reactive of the oxidants and thus require very high temperatures to passivate the tars. High temperatures generate high pressures in the reacton vessel and thus limit the utility of chlorine in liquid phase regeneration.

As is well known, fluorine is extremely reactive and, because of this, its general utility is somewhat restricted. However, in the process of the present invention, this high reactivity is advantageous, since it materially contributes to initiating and maintaining a relatively low temperature, low pressure oxidation of the tars that contribute to the deactivation of catalytic activity of the halogenated Lewis acids. Reactions of fluorine are rapid, so that any build-up of oxidants that could lead to run-away combustion is easily avoided. Chlorine trifluoride is less volatile and may linger in excess in the reaction vessel.

It is advantageous in carrying out the process of the present invention for regeneration of liquid phase halogenated Lewis acid catalysts to first dissolve the catalyst in an inert solvent, unreactive to chlorine trifluoride or fluorine as well as to the halogenated Lewis acid. Such solvents are selected from the group consisting of perfluorinated hydrocarbons, perchlorofluorinated hydrocarbons, perfluorochloroethers and hydrogen fluoride. Mixtures of such solvents can also be used. Illustrative perhalogenated liquid inert solvents of use in the process of this invention are $(CF_2Cl)_2CFOCF_2OCF(CF_2Cl)_2$, $CF_2ClCF_2OCF_2OCF_2CF_2Cl$ and the like. Suitable solvents of use in this embodiment of the present invention are disclosed in U.S. Pat. No. 5,332,790 incorporated herein by reference.

Vessels suitable for liquid phase oxidation are those constructed of materials that are resistant to chlorine, chlorine fluoride, chlorine trifluoride or fluorine. Suitable materials of construction are the fluoropolymers, i.e. TEFLON® fluoropolymer, and metals and metal alloys such as nickel and Hastelloy. Metal vessels with a fluoropolymer lining have both superior resistivity as well as desireable pressure capabilities.

It is preferred to add oxidant continuously rather than batchwise in order to control exothermic reactions and avoid run-away reactions. Complete reaction is signalled by cessation of the exotherm and off-gas generation that accompanies oxidant addition.

After oxidation with the one or more of the halogen fluoride agents in accordance with the present invention, the regenerated catalyst may be used "as is" or the passivated tars may be separated by means such as distillation, by liquid/liquid extraction and the like.

In the second embodiment of the present invention, spent Lewis acid catalysts are regenerated in the vapor phase with one or more of the above-disclosed halogen fluoride oxidizing agents. For vapor phase regeneration, it is preferred to employ chlorine, chlorine fluoride, chlorine trifluoride or fluorine as the oxidizing agent. Most preferably chlorine or chlorine fluoride is used in this vapor phase process with chlorine being especially preferred to regenerate the spent halogenated Lewis acid catalyst.

As noted earlier, chlorine is the least reactive of the oxidants and thus requires very high temperatures to passivate the tars. As such, when used in the liquid phase it has its limitations. However, chlorine is amenable to use in the vapor phase. In addition, many of the halogenated Lewis acid catalysts have boiling points that make them distillable materials. While considered high in general terms, most halogenated Lewis acid catalysts have vaporization temperatures that are easily attainable in an electric tube furnace. In accordance with a further embodiment of the process of the present invention, spent Lewis acid catalyst can be readily volatilized and reacted with chlorine at temperatures of about 400° C. to regenerate active catalyst.

Table 1 shows the melting and boiling temperatures for halogenated Lewis acid catalysts typically used for fluorine exchange or hydrofluorination reactions.

TABLE 1

| Lewis Acid | Melting Point ° C. | Boiling Point ° C. |
|---|---|---|
| AlCl3 | 193 | 180 (subl.) |
| FeCl₃ | 282 | 315 |
| MoF6 | 17 | 35 |
| NbF5 | 80 | 235 |
| SbF3 | ~292 | 376 |
| SbCl5 | 3 | 79 |
| SbCl2F3 | — | 40 |
| SbCl3F2 | — | 65 |
| SbF5 | 6 | 150 |
| SnF4 | −33 | 114 |

TABLE 1-continued

| Lewis Acid | Melting Point ° C. | Boiling Point ° C. |
|---|---|---|
| TaF4 | 97 | 229 |
| TiF4 | >400 | 284 (subl.) |
| VF3 | >800 | (subl.) |
| WCl6 | 275 | 347 |
| WF6 | 2.3 | 17.5 |

It is convenient to practice the process of the present this invention in a vertically positioned tubular reactor heated with an electric tube furnace. The reaction may be run at any pressure that allows the spent catalyst/tar mixture to remain mobile. Preferentially, the spent catalyst/tar mixture should be completely vaporized. As such, it is preferred to operate the reactor with no back-pressure on the system. The reaction tube is most preferably packed with a porous chemically resistant packing so as to insure good heat transfer to the materials flowing through the tube. The halogen fluoride oxidizing agent, i.e., chlorine or chlorine fluoride is fed in excess as a gas into the top of the reactor. Spent catalyst/tar mixture is then pumped into the top of the reactor. Preheating of the feeds is optional, but may necessitate chemically resistant preheaters and feed lines. The regenerated catalyst is collected in a cooled collecting vessel and off-gases and any unreacted oxidant are continuously vented. The regenerated catalyst may be used "as is" or the passivated tars may be separated by conventional means, such as distillation, liquid/liquid extraction and the like.

In carrying out the process of the present invention, it is most preferred to operate the regeneration reactor at a temperature from about 300° C. to about 500° C. Since the regeneration process occurs more rapidly at temperatures greater that 400° C., it is preferred to operate the process of the present invention in this range. Vessels for such high temperature oxidations using the oxidizing agents of the present invention are restricted to Hastelloy or nickel which have effective operating temperature limits of 485° C. See, for example, *Resistance To Corrosion*, The International Nickel Company, 1970.

The following examples are for the purposes of illustration only and should not be regarded as limiting the invention disclosed and claimed herein in any manner.

EXAMPLES

Fluorinated Lewis acid liquid phase catalysts are typically generated by converting the metal chlorides to the metal fluorides. Some catalysts such as antimony and aluminum are known to exist as mixed chlorofluorides. Additionally, high oxidation state metals like antimony (V) are likely to be reduced to all or some extent (i.e. antimony (III)) through useage. The exact make-up of a "spent" catalyst is typically not characterized, but rather evaluated simply by its reactivity relative to "fresh" catalyst. In the following examples, catalysts are identified in terms of "fresh" catalyst and no attempt is made to identify the complex make-up of the material beyond determining the weight percentage of tars.

A working sample of spent antimony chlorofluoride/tantalum chlorofluoride catalyst, deactivated by the presence of tars, was created by successive chlorine for fluorine exchange reactions of 1-chloro-3,3,3-trichloropropene to 1,1,1,3,3-pentafluoropropane followed by removal of HF and volatiles under aspirator vacuum. Tar content was 36% by weight.

Example 1
Low Temperature Liquid Phase Regeneration of Halogenated Lewis Acids Used In Liquid Phase Hydrofluorination Process (Comparative)

100 grams of spent catalyst/tar mixture was charged to a 300 ml Hastelloy pressure reactor. The reactor was evacuated and cooled in a dry ice/acetone bath. 40 grams of chlorine was charged and the reactor heated to 100° C. for 3 days. The reactor was cooled to 80° C. and vented. Direct observation of the catalyst showed no visible changes.

To test the activity of the catalyst, a fluorine for chlorine exchange reaction was performed on 1-chloro-3,3,3-trifluoropropene. 35 grams of 1-chloro-3,3,3-trifluoropropene and 42 grams of HF were added and the reactor heated to 100° C. for 3 hours without venting. The contents of the reactor were vented into ice to give 40 grams of material that was <3% 1,1,1,3,3-pentafluoropropane. The catalyst remained inactive.

Example 2
Vapor Phase Regeneration of Halogenated Lewis Acids Used In Liquid Phase Hydrofluorination Process.

A 24 inch×1" I.D. Hastelloy pipe (reactor) was filled with 333 g of ½" Hastelloy rings and placed vertically in a tube furnace. A 300 ml hastelloy collecting vessel was fitted to the bottom outlet end of the pipe. The collecting vessel was connected to a caustic scrubber which was open the the atmosphere so that no backpressure was maintained in the reactor. The reactor was heated to 400° C. and the collecting vessel was cooled to −10° C. Chlorine gas was fed into the top of the reactor at 1 L/min. Spent catalyst was then fed into the top of the reactor at 1 gram/min. A total of 203 grams of the spent antimony/tantalum catalyst was fed over 3½ hours. 151 grams of material were collected. The Hastelloy rings weighed 336 grams after the reaction indicating that 98.5% of the feed passed through the reactor.

To test the activity of the catalyst, a fluorine for chlorine exchange reaction was performed on 1-chloro-3,3,3-trifluoropropene. 110 grams of the regenerated catalyst was transferred to a hastelloy pressure reactor. 68 grams of 1-chloro-3,3,3-trifluoropropene and 60 grams of HF were added and the reactor heated to 100° C. for ½ hour without venting. The contents of the reactor were vented into ice to give 73 grams of material that was 78% 1,1,1,3,3-pentafluoropropane. The catalyst was active.

We claim:

1. A method for the regeneration of a spent catalyst consisting of a halogenated Lewis acid catalyst said method comprising treating said spent catalyst consisting of a halogenated Lewis acid catalyst with an oxidizing agent that is selected from the group consisting of chlorine, fluorine, a fluoride formed from the combination of fluorine with chlorine, fluorine with bromine or fluorine with iodine, a mixed halogen fluoride formed from a combination of fluorine with chlorine and bromine, fluorine with chlorine and iodine or fluorine with bromine and iodine and mixtures thereof.

2. The method according to claim 1 wherein said oxidizing agent is selected from the group consisting of chlorine, chlorine fluoride, chlorine trifluoride and fluorine.

3. The method according to claim 2 wherein said spent Lewis acid catalyst is a halide of antimony, niobium, tantalum, tin, titanium or tungsten.

4. The method according to claim 3 wherein said spent Lewis acid catalyst is a chloride, fluoride or chlorofluoride.

5. The method according to claim 1 wherein said Lewis acid catalyst is selected from the group consisting of boron trifluoride, aluminum chloride, aluminum chloro difluoride, aluminum fluoride dichloride, aluminum fluoride, iron (III) chloride, nickel (II) chloride, cobalt (II) chloride, antimony (V) chloride, antimony (V) dichloride trifluoride, antimony (V) difluoride trichloride, antimony (III) fluoride, antimony (V) fluoride, niobium (V) chloride, tin (IV) chloride, titanium (IV) chloride, titanium (IV) dichloride difluoride, titanium (IV) fluoride, tungsten (VI) chloride, tungsten (VI) fluoride, tantalum (V) chloride or tantalum (V) fluoride.

6. The method according to claim 1 wherein said regeneration is carried out in the liquid phase.

7. The method according to claim 6 wherein said spent Lewis acid catalyst is dissolved in an inert solvent selected from the group consisting of a perfluorinated hydrocarbon, perchlorinated hydrocarbon, perfluorochloroether and mixtures thereof.

8. The method according to claim 7 wherein said oxidizing agent is fluorine.

9. The method according to claim 7 wherein said oxidizing agent is chlorine trifluoride.

10. The method according to claim 7 wherein said oxidizing agent is chlorine monofluoride.

11. The method according to claim 7 wherein said oxidizing agent is chlorine.

12. The method according to claim 1 wherein said regeneration is carried out in the vapor phase.

13. The method according to claim 12 wherein said halogen fluoride oxidizing agent is chlorine.

14. The method according to claim 12 wherein said oxidizing agent is chlorine trifluoride.

15. The method according to claim 12 wherein said oxidizing agent is chlorine monofluoride.

16. The method according to claim 12 wherein said oxidizing agent is fluorine.

17. A method for the regeneration of a spent catalyst consisting of a halogenated Lewis acid catalyst said method comprising treating said spent Lewis acid catalyst in the vapor phase with an oxidizing agent selected from the group consisting of chlorine, chlorine fluoride, chlorine trifluoride and fluorine.

18. The method according to claim 17 wherein said oxidizing agent is chlorine.

* * * * *